(12) United States Patent
Fujimoto et al.

(10) Patent No.: US 11,156,170 B2
(45) Date of Patent: Oct. 26, 2021

(54) CONTROL DEVICE FOR INTERNAL COMBUSTION ENGINE

(71) Applicant: AISIN SEIKI KABUSHIKI KAISHA, Kariya (JP)

(72) Inventors: Seiichi Fujimoto, Chiryu (JP); Masaaki Kaneko, Aichi (JP); Hirokazu Tanaka, Nagoya (JP); Suguru Kamiya, Takahama (JP); Kohei Fujii, Kawasaki (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 110 days.

(21) Appl. No.: 16/611,907

(22) PCT Filed: Feb. 28, 2018

(86) PCT No.: PCT/JP2018/007442
§ 371 (c)(1),
(2) Date: Nov. 8, 2019

(87) PCT Pub. No.: WO2018/207436
PCT Pub. Date: Nov. 15, 2018

(65) Prior Publication Data
US 2021/0140377 A1 May 13, 2021

(30) Foreign Application Priority Data
May 12, 2017 (JP) .............................. JP2017-095884

(51) Int. Cl.
*F02D 13/02* (2006.01)
*F02M 26/14* (2016.01)
(Continued)

(52) U.S. Cl.
CPC .......... *F02D 13/0215* (2013.01); *F01L 1/047* (2013.01); *F01N 13/10* (2013.01);
(Continued)

(58) Field of Classification Search
CPC .... F01N 13/009; F01N 13/10; F01N 2410/00; F01N 2550/06; F02M 26/01;
(Continued)

(56) References Cited

U.S. PATENT DOCUMENTS

| 2001/0011536 A1 | 8/2001 | Nonomura et al. | |
| 2002/0062799 A1* | 5/2002 | Murata | F01L 1/34 123/90.15 |

(Continued)

FOREIGN PATENT DOCUMENTS

| JP | 2001221087 A | 8/2001 |
| JP | 2002206436 A | 7/2002 |

(Continued)

OTHER PUBLICATIONS

Machine Translation JP 2017-014941 (Year: 2021).*

(Continued)

*Primary Examiner* — Audrey B. Walter
*Assistant Examiner* — Dapinder Singh
(74) *Attorney, Agent, or Firm* — Buchanan Ingersoll & Rooney PC (57) ABSTRACT

A control device for an internal combustion engine includes an internal combustion engine and a valve opening-closing timing control device. The valve opening-closing timing control device has a phase adjustment mechanism for setting a relative rotation phase of a driving-side rotator and a driven-side rotator. The phase adjustment mechanism overlaps a timing of opening an intake valve with a timing of opening an exhaust valve, by setting, in a predetermined period, the relative rotation phase such that the exhaust valve closes after a top dead center position has been reached, and a bypass passage is provided that connects an exhaust passage of one cylinder that is in an exhaust process to the (Continued)

exhaust passage of another cylinder that is in an intake process at the same time as the exhaust process.

3 Claims, 7 Drawing Sheets

(51) Int. Cl.
  *F01L 1/04* (2006.01)
  *F01N 13/10* (2010.01)
  *F02M 26/53* (2016.01)
  *F01L 1/047* (2006.01)
  *F02M 35/10* (2006.01)
(52) U.S. Cl.
  CPC .......... *F02M 26/14* (2016.02); *F02M 26/53* (2016.02); *F02M 35/10222* (2013.01)
(58) Field of Classification Search
  CPC .. F02M 26/44; F02M 26/53; F02M 35/10222; F02D 13/0215; Y02T 10/12; Y02T 10/40
  USPC .......................................................... 60/323
  See application file for complete search history.

(56) References Cited

U.S. PATENT DOCUMENTS

| | | | | |
|---|---|---|---|---|
| 2011/0023847 | A1* | 2/2011 | Gates | F02D 41/0072 123/568.21 |
| 2012/0150419 | A1* | 6/2012 | Pursifull | F02M 63/029 701/104 |
| 2012/0197508 | A1* | 8/2012 | Seaman | F16H 61/0213 701/102 |
| 2014/0007854 | A1* | 1/2014 | Kosaka | F02D 13/0265 123/568.14 |

FOREIGN PATENT DOCUMENTS

| | | |
|---|---|---|
| JP | 2006336579 A | 12/2006 |
| JP | 2017014941 A | 1/2017 |

OTHER PUBLICATIONS

Machine Translation JP 2006-336579 (Year: 2021).*
International Search Report (with English Translation) and Written Opinion issued in corresponding International Patent Application No. PCT/JP2018/007442, 9 pages (dated May 15, 2018).
Notification of Transmittal of Translation of the International Preliminary Report on Patentability (Forms PCT/IB/338 and PCT/IB/373) and the Written Opinion of the International Searching Authority (Form PCT/ISA/237) dated Nov. 21, 2019, by the International Bureau of WIPO in corresponding International Application No. PCT/JP2018/007442. (9 pages).

* cited by examiner

| CYLINDER | FIRST CYCLE | | | | SECOND CYCLE | | | |
|---|---|---|---|---|---|---|---|---|
| K1 | INTAKE | COMPRESSION | EXPANSION | EXHAUST | INTAKE | COMPRESSION | EXPANSION | EXHAUST |
| K2 | COMPRESSION | EXPANSION | EXHAUST | INTAKE | COMPRESSION | EXPANSION | EXHAUST | INTAKE |
| K3 | EXHAUST | INTAKE | COMPRESSION | EXPANSION | EXHAUST | INTAKE | COMPRESSION | EXPANSION |
| K4 | EXPANSION | EXHAUST | INTAKE | COMPRESSION | EXPANSION | EXHAUST | INTAKE | COMPRESSION |

CONTROL DEVICE FOR INTERNAL COMBUSTION ENGINE

TECHNICAL FIELD

The present invention relates to a control device for an internal combustion engine and relates specifically to a technology for suppressing emission of unburned HC.

BACKGROUND ART

When an engine is started, a large amount of injected fuel is introduced into a combustion chamber in order to reliably perform initial combustion in cylinders, and the amount of unburned HC (hydrocarbon) generated due to incomplete combustion is likely to increase. Also, since a catalyst for cleaning unburned HC is not yet warm nor activated when the engine is started, unburned HC is likely to be emitted to the outside.

Patent Document 1 discloses a technology called internal EGR (Exhaust Gas Recirculation) for overlapping a timing of opening an intake valve with a timing of opening an exhaust valve after initial combustion and before the next combustion in each cylinder, thereby returning exhaust gas that contains unburned HC in an exhaust passage to the combustion chamber and re-burn the returned exhaust gas in and after the second cycle (hereinafter, four processes including intake, compression, expansion, and exhaust will be expressed as "a cycle"), and thus reducing the amount of emitted unburned HC. A technology is also disclosed by which, after the temperature in the exhaust passage has increased, the exhaust valve is opened at the final stage of the expansion process by advancing the exhaust valve, and combustion is also continued in the exhaust passage as well as in the combustion chamber. This technology thus quickly activates the catalyst to improve the efficiency in cleaning of unburned HC.

Patent Document 2 discloses a technology for setting the amount of fuel to be injected in and after the second cycle, based on the intake pressure in the cylinders in the first cycle, including initial combustion, and the amount of change in the intake pressure. This technology thus sets, in and after the second cycle, the amount of fuel to be injected while giving consideration to fuel attached to the exhaust passage and the combustion chamber, and reduces the amount of unburned HC emitted due to incomplete combustion.

CITATION LIST

Patent Literature

Patent Document 1: JP 2002-206436A
Patent Document 2: JP 2001-221087A

SUMMARY OF INVENTION

Technical Problem

However, a conventional control device for an internal combustion engine can reduce the amount of emitted unburned HC only after the first cycle including initial combustion, that is, only in and after the second cycle. That is to say, the emission of unburned HC cannot be reliably suppressed during initial combustion during which a large amount of fuel is injected, and there is room for improvement.

There is, therefore, a demand for a control device for an internal combustion engine with which the emission of unburned HC can be further suppressed.

Solution to Problem

A characteristic configuration of a control device for an internal combustion engine lies in including: an internal combustion engine including: a plurality of cylinders each including a combustion chamber; a piston that moves between a top dead center position and a bottom dead center position in each of the cylinders; a crankshaft connected to the piston; an intake passage and an exhaust passage that are connected to the combustion chamber in each of the cylinders; an intake valve provided at a connecting port between the combustion chamber in each of the cylinders and the intake passage, and an exhaust valve provided at a connecting port between the combustion chamber and the exhaust passage; and an intake shaft and an exhaust shaft that are connected to the intake valve and the exhaust valve, respectively; and a valve opening-closing timing control device including: a driving-side rotator that rotates synchronously with the crankshaft; a driven-side rotator that rotates integrally with the exhaust shaft, the driven-side rotator being arranged so as to be able to relatively rotate with respect to the driving-side rotator, coaxially with a rotation axis of the driving-side rotator; and a phase adjustment mechanism for setting a relative rotation phase of the driving-side rotator and the driven-side rotator, wherein the phase adjustment mechanism overlaps a timing of opening the intake valve with a timing of opening the exhaust valve, by setting, in a predetermined period, the relative rotation phase such that the exhaust valve closes after the top dead center position has been reached, and a bypass passage is provided that connects the exhaust passage of one of the cylinders that is in an exhaust process to the exhaust passage of another one of the cylinders that is in an intake process at the same time as the exhaust process.

According to this configuration, in the intake process in which the piston moves from the top dead center position to the bottom dead center position, the timing of opening the exhaust valve is overlapped with the timing of opening the intake valve. As a result, exhaust gas that contains unburned HC in the exhaust passage can be returned to the combustion chamber to reburn the unburned HC, and the amount of emitted unburned HC can be reduced.

Also, according to this configuration, the bypass passage is provided that connects the exhaust passage of one of the cylinders that is in the exhaust process to an exhaust passage of another one of the cylinders that is in the intake process at the same timing as the aforementioned exhaust passage. Thus, exhaust gas that contains unburned HC in the one of the cylinders is introduced into the combustion chamber in the another one of the cylinders in a state where the exhaust valve is open in the overlap period. As a result, not only is exhaust gas that contains unburned HC in the exhaust passage of the another one of the cylinders returned to the combustion chamber, but also exhaust gas that contains unburned HC in the exhaust passage of the one of the cylinders introduced into the combustion chamber in the another one of the cylinders. Accordingly, for example, during initial combustion during which a large amount of fuel is injected and a large amount of unburned HC is emitted, unburned HC emitted from the one of the cylinders is introduced into the combustion chamber in the another one of the cylinders and is reburned, and thus, the amount of emitted unburned HC can be further reduced.

Thus, it is possible to provide a control device for an internal combustion engine with which the emission of unburned HC can be further suppressed.

Another configuration lies in that the bypass passage is provided with a check valve for allowing the flow of exhaust gas from the exhaust passage of the one of the cylinders to the exhaust passage of the another one of the cylinders, and for blocking the flow of exhaust gas from the exhaust passage of the another one of the cylinders to the exhaust passage of the one of the cylinders.

In an internal combustion engine that repeats a cycle (four processes) of intake, compression, expansion, and exhaust, with a combination of one of the cylinders being in the exhaust process and another one of the cylinders being in the intake process, the another one of the cylinders is in the exhaust process when the one of the cylinders is in the expansion process. For this reason, if, as in this configuration, a check valve for preventing exhaust gas from flowing back from the exhaust passage of the another one of the cylinders to the one of the cylinders is provided, it is possible to prevent such an issue as in the case where a large amount of exhaust gas in the exhaust passage of the another one of the cylinders that is in the exhaust process flows into the combustion chamber in the one of the cylinders that is in the expansion process, resulting in deterioration in combustion stability.

Another configuration lies in that the bypass passage is provided with an electromagnetic valve.

For example, during idling after a predetermined period of time has elapsed since initial combustion, a small amount of fresh air is introduced into the cylinders, and therefore, there may be cases where the combustion stability is reduced due to unburned HC emitted from one of the cylinders being introduced into the combustion chamber in another one of the cylinders. For this reason, if an electromagnetic valve is provided in the bypass passage as in this configuration, control can be performed such that the electromagnetic valve is closed at the aforementioned timing to block the bypass passage. Thus, control can be performed while giving consideration to the balance between a reduction in the emission of unburned HC and the combustion stability.

Another configuration lies in that the predetermined period is a period from before initial combustion is performed in the combustion chamber immediately after cranking in the one of the cylinders until when the exhaust valve that is opened after the initial combustion has been performed is first closed, and the electromagnetic valve is open in the predetermined period and is closed when the predetermined period ends.

According to this configuration, since the electromagnetic valve is open before initial combustion chamber is performed in one of the cylinders, exhaust gas with high pressure at an early stage of the exhaust process in the one of the cylinders is introduced into the combustion chamber in another one of the cylinders in a state where the exhaust valve is open in the overlap period. As a result, exhaust gas that contains a large amount of unburned HC generated during initial combustion is reburned, and the amount of emitted unburned HC can be reliably reduced. Also, according to this configuration, since the electromagnetic valve is closed at the timing at which the exhaust valve is closed for the first time after initial combustion is performed in one of the cylinders, exchange of exhaust gas between the cylinders is prohibited after exhaust gas has been introduced from the one of the cylinders in which initial combustion is to occur into another one of the cylinders. As a result, after the electromagnetic valve has been closed, internal EGR is introduced by overlapping, in each of the cylinders, the timing of opening the exhaust valve with the timing of opening the intake valve, and the amount of fresh air to be taken in is increased by canceling the overlapping, and thus, control can be performed while giving consideration to the balance between a reduction in the emission of unburned HC and the combustion stability.

Another configuration lies in that, while the internal combustion engine is operating, the predetermined period is a period in which charging efficiency of the internal combustion engine is greater than or equal to a predetermined value, and a rotational speed of the internal combustion engine is smaller than or equal to a predetermined rotational speed and is in a high-load low-rotation state, and the electromagnetic valve is open only in the predetermined period.

Since the intake pressure is high in a high-load low-rotation period, it is difficult to introduce internal EGR in the combustion chambers in the cylinders. If the electromagnetic valve is open in the period in the high-load low-rotation state, as in this configuration, exhaust gas with high pressure at the early stage of the exhaust process in the exhaust passage of one of the cylinders is introduced into the exhaust passage of another one of the cylinders in which the exhaust valve is open in the overlap period. As a result, the flow rate of the internal EGR that is returned to the combustion chamber in the another one of the cylinders increases, and thus, the internal EGR can be reliably introduced to the combustion chamber. Accordingly, the emission of unburned HC can be suppressed.

DESCRIPTION OF EMBODIMENTS

Hereinafter, an embodiment of the present invention will be described based on the drawings. However, the present invention is not limited to the following embodiment, and various modifications may be made without departing from the gist of the invention.

Figure 1:
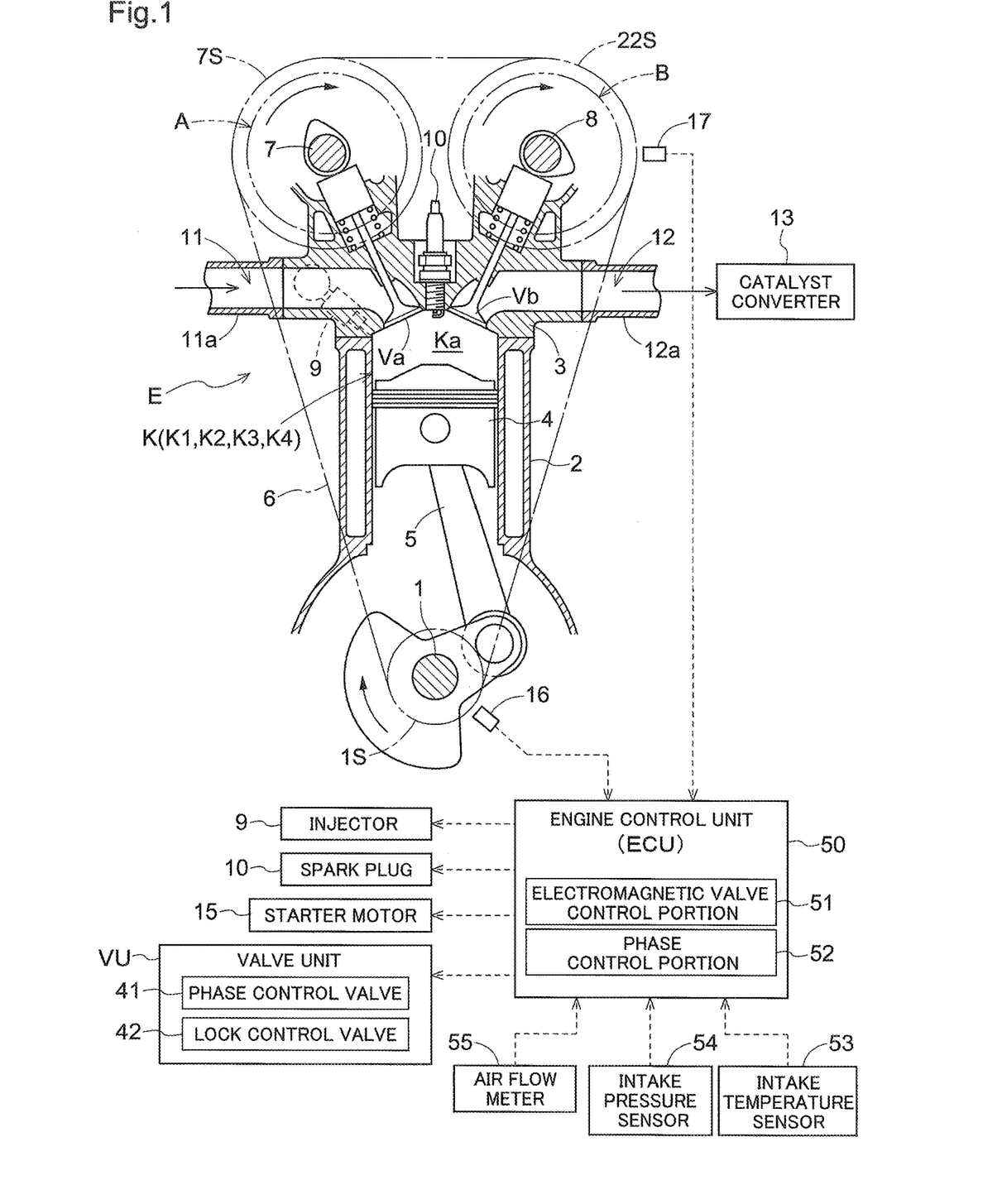
FIG. 1 shows a configuration of a control device for an internal combustion engine.
Figure 2:
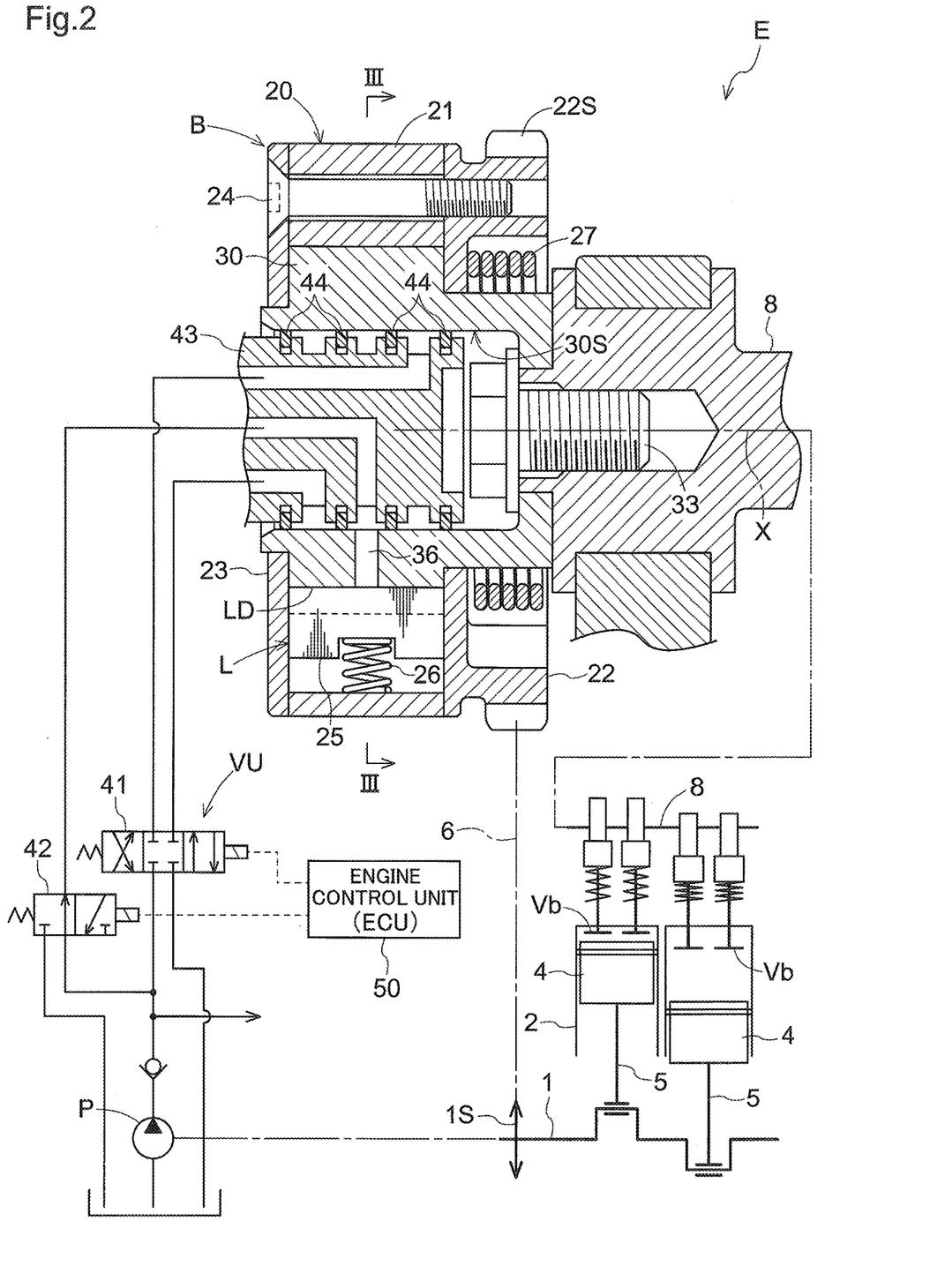
FIG. 2 shows a valve opening-closing timing control device and an oil passage system.

As shown in FIGS. 1 and 2, a control device for an internal combustion engine includes an engine E (an example of an internal combustion engine), an intake-side valve opening-closing timing control device A for setting timings of opening and closing each intake valve Va in the engine E, an exhaust-side valve opening-closing timing control device B for setting timings of opening and closing each exhaust valve Vb in the engine E, and an engine control unit (ECU) 50 for controlling the engine E.

(Internal Combustion Engine)

The engine E shown in FIG. 1 is provided in a vehicle, such as a passenger car. The engine E includes four cylinders K, a piston 4, a crankshaft 1, an intake passage 11, an exhaust passage 12, an intake valve Va, an exhaust valve Vb, an intake shaft 7 (intake-side camshaft), and an exhaust shaft 8 (exhaust-side camshaft).

Each cylinder K is constituted by an inner-circumferential wall of a cylinder block 2, and a bottom wall of a cylinder head 3. Each cylinder K slidably accommodates the piston 4, and has a combustion chamber Ka, which is a space surrounded by a crown surface of the piston 4 located at the top dead center position, the inner-circumferential wall of the cylinder block 2, and the bottom wall of the cylinder head 3. The cylinder head 3 is provided with an injector 9 for injecting fuel into the combustion chamber Ka, and a spark plug 10.

The piston 4 moves in the cylinder K between the top dead center position and the bottom dead center position. The crankshaft 1 is supported by the cylinder block 2 and is connected to the piston 4 by a connecting rod 5.

The intake passage 11 is a flow path from a surge tank (not shown) of an intake manifold 11a connected to the cylinder head 3 to the intake valve Va, and is connected to the combustion chamber Ka in the cylinder K. The intake valve Va is a valve body that is supported by the cylinder head 3, and opens and closes a connecting port (intake port) between the combustion chamber Ka and the intake passage 11. The intake manifold 11a is provided with an intake temperature sensor 53, an intake pressure sensor 54, and an air flow meter 55.

Figure 5:
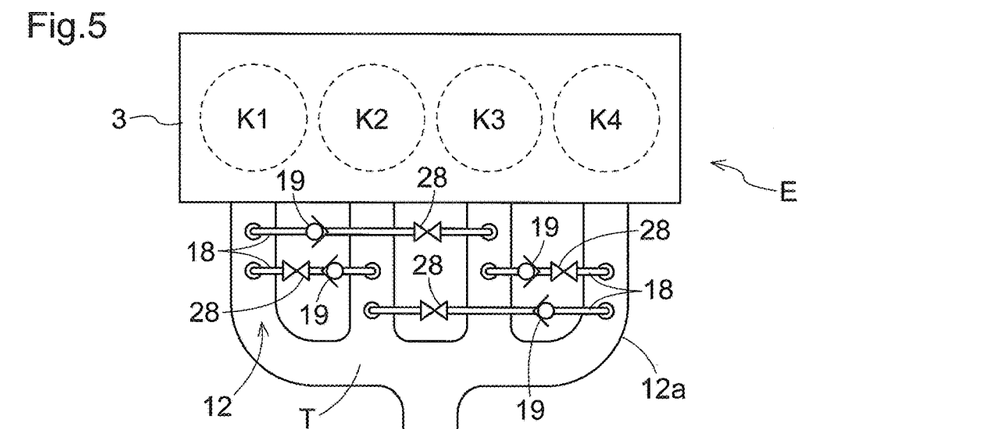
FIG. 5 is a conceptual diagram of bypass passages provided in exhaust passages.

As shown in FIGS. 1 and 5, the exhaust passage 12 is a flow path from a merging portion T of an exhaust manifold 12a connected to the cylinder head 3 to the exhaust valve Vb, and is connected to the combustion chamber Ka in the cylinder K. The exhaust valve Vb is a valve body that is supported by the cylinder head 3 and opens and closes a connecting port (exhaust port) between the combustion chamber Ka and the exhaust passage 12. Although, in this embodiment, four exhaust passages 12 connected to respective cylinders K are merged with each other at one merging portion T, a configuration may alternatively be employed in which the exhaust passages 12 connected to any two of the cylinders K are merged with each other at the merging portion T, and then two pairs of the exhaust passages 12 are again merged with each other.

A catalytic converter 13 for cleaning burned gas (exhaust gas; hereinafter "burned gas") is provided on the downstream side of the merging portion T at which the exhaust passages 12 merge. When the engine E is started, the internal temperature of the catalytic converter 13 is low, and therefore, there is concern that unburned HC will be emitted without being treated by the catalytic converter 13.

In this embodiment, bypass passages 18 are provided, each of which connects two exhaust passages 12 to each other. The engine E in this embodiment includes four cylinders K and is therefore provided with four bypass passages 18. Each of the bypass passages 18 connects the exhaust passage 12 of one cylinder K that is in the exhaust process to the exhaust passage 12 of another cylinder K that is in the intake process at the same timing as the exhaust process. Specifically, four bypass passages 18 are provided to connect the exhaust passages 12 of a first cylinder K1 and a second cylinder K2, the exhaust passages 12 of the first cylinder K1 and a third cylinder K3, the exhaust passages 12 of the second cylinder K2 and a fourth cylinder K4, and the exhaust passages 12 of the third cylinder K3 and the fourth cylinder K4. Thus, burned gas that contains unburned HC emitted in the exhaust process in one cylinder K is introduced into the combustion chamber Ka in another cylinder K, and the unburned HC is reburned.

Each of the four bypass passages 18 is provided with a check valve 19 for allowing the flow of burned gas from the exhaust passage 12 of one cylinder K to the exhaust passage 12 of another cylinder K, and for blocking the flow of burned gas from the exhaust passage 12 of the another cylinder K to the exhaust passage 12 of the one cylinder K. Specifically, the check valve 19 allows the flow of burned gas from the first cylinder K1 that is in the exhaust process to the second cylinder K2 that is in the intake process at the same timing, and blocks the flow of burned gas from the second cylinder K2 that is in the exhaust process to the first cylinder K1 that is in the expansion process at the same timing (see FIG. 7). Similarly, the check valve 19 allows the flow of burned gas from the second cylinder K2 to the fourth cylinder K4 and blocks the flow of burned gas from the fourth cylinder K4 to the second cylinder K2. Also, the check valve 19 allows the flow of burned gas from the third cylinder K3 to the first cylinder K1 and blocks the flow of burned gas from the first cylinder K1 to the third cylinder K3. Also, the check valve 19 allows the flow of burned gas from the fourth cylinder K4 to the third cylinder K3 and blocks the flow of burned gas from the third cylinder K3 to the fourth cylinder K4. This configuration makes it possible to prevent such an issue as in the case where a large amount of exhaust gas in the exhaust passage 12 of one cylinder K that is in the exhaust process flows into the combustion chamber Ka in another cylinder K that is in the expansion process, thus deteriorating the combustion stability.

Furthermore, each of the four bypass passages 18 is provided with an electromagnetic valve 28 on the upstream side of the check valve 19 in the direction in which burned gas flows. By providing the electromagnetic valve 28, the flow of burned gas can be blocked by closing the electromagnetic valve 28, irrespective of whether the check valve 19 is open or closed. As a result, the check valve 19 is not repeatedly opened or closed, and thus, the life span of the check valve 19 can be extended. Note that the electromagnetic valve 28 may alternatively be provided on the path of each bypass passage 18 on the downstream side of the check valve 19 in the direction in which burned gas flows.

As shown in FIG. 1, the intake shaft 7 is supported by the cylinder head 3, and is connected to the intake valve Va. The exhaust shaft 8 is supported by the cylinder head 3, and is connected to the exhaust valve Vb. The intake valve Va is opened and closed as a result of the intake shaft 7 being driven to rotate, and the exhaust valve Vb is opened and closed as a result of the exhaust shaft 8 being driven to rotate.

This engine E has a starter motor 15 for transmitting a driving rotational force to the crankshaft 1 and has a shaft sensor 16 for detecting the rotation angle and the rotational speed, at a position near the crankshaft 1. Also, a phase sensor 17 for detecting a relative rotation phase of an external rotor 20 and an internal rotor 30 is provided near the later-described exhaust-side valve opening-closing timing control device B.

(Valve Opening-Closing Timing Control Device)

Since the intake-side valve opening-closing control device A and the exhaust-side valve opening-closing timing control device B have similar configurations, the configuration of the exhaust-side valve opening-closing timing control device B will be mainly described below. Note that, although the valve opening-closing timing control device A and the valve opening-closing timing control device B are described as hydraulic valve opening-closing timing control devices, at least one of the valve opening-closing timing control device A and the valve opening-closing timing control device B may be configured as an electric valve opening-closing timing control device.

The exhaust-side valve opening-closing timing control device B is configured to control the timing (opening-closing timing) of opening and closing the exhaust valve Vb by changing the relative rotation phase of the external rotor 20 and the internal rotor 30 (hereinafter referred to as "relative rotation phase").

As shown in FIGS. 1 to 4, the exhaust-side valve opening-closing timing control device B includes the external rotor 20 (an example of a driving-side rotator), which rotates around a rotation axis X of the exhaust shaft 8, the internal rotor 30 (an example of a driven-side rotator), which is connected to the exhaust shaft 8 by a connecting bolt 33, a lock mechanism L, which extends between the external rotor 20 and the internal rotor 30, and a valve unit VU (an example of a phase adjustment mechanism). Although the details will be described later, the lock mechanism L includes lock members 25, lock springs 26, lock recessed portions LD, and a restricting recessed portion Ds.

Figure 3:
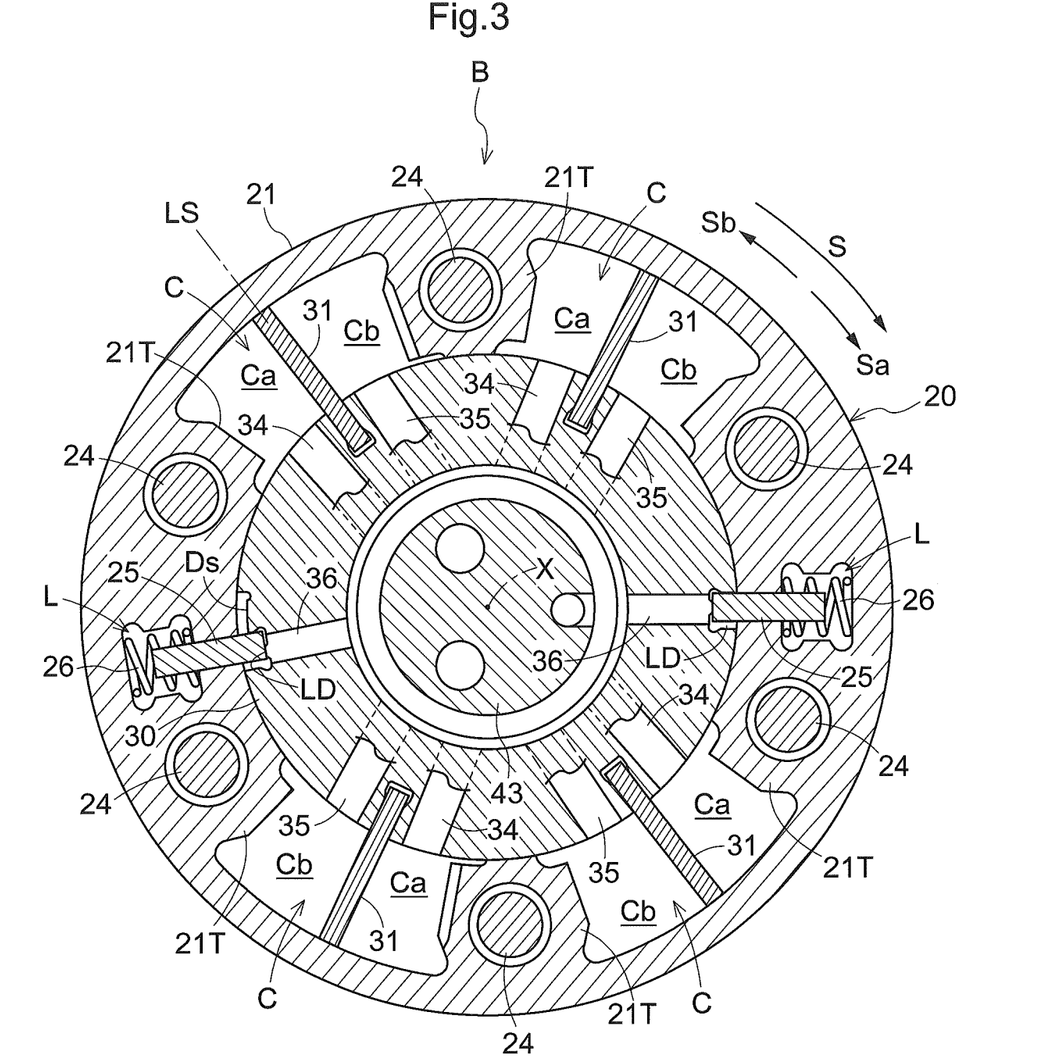
FIG. 3 is a cross-sectional view of FIG. 2 taken along a line III-III and is a cross-sectional view of the valve opening-closing timing control device at an intermediate lock phase.

The external rotor 20 includes a rotor body 21, which has a cylindrical shape, a rear block 22, which is arranged at one end portion, in a direction parallel to the rotation axis X, of the rotor body 21, and a front plate 23, which is arranged at the other end portion, in the direction parallel to the rotation axis X, of the rotor body 21, and is configured by fastening these members with a plurality of fastening bolts 24.

A driving sprocket 22S, to which a rotational force is transmitted from the crankshaft 1, is formed on an outer circumferential surface of the rear block 22. Similarly, a sprocket 7S is also provided on the outer circumferential side of the intake-side valve opening-closing timing control device A. A timing chain 6 is wound around the driving sprocket 22S on the exhaust-side valve opening-closing timing control device B, the sprocket 7S on the outer circumferential surface of the intake-side valve opening-closing timing control device A, and an output sprocket 1S of the crankshaft 1 (see FIG. 1). Thus, the external rotor 20 is configured to rotate synchronously with the crankshaft 1.

In the exhaust-side valve opening-closing timing control device B, the external rotor 20 is rotated in a driven rotation direction S by the driving force transmitted from the timing chain 6. A direction in which the internal rotor 30 rotates in the same direction as the driven rotation direction S relative to the external rotor 20 will be referred to as an advancing direction Sa, and a rotation direction opposite to the advancing direction Sa will be referred to as a retarding direction Sb. In the exhaust-side valve opening-closing timing control device B, the timing of opening the exhaust valve Vb (opening timing) and the timing of closing the exhaust valve Vb (closing timing) are made to come earlier by displacing the relative rotation phase in the advancing direction Sa. Conversely, the timing of opening the exhaust valve Vb (opening timing) and the timing of closing the exhaust valve Vb (closing timing) are delayed by displacing the rotation phase in the retarding direction Sb.

A plurality of protruding portions 21T are integrally formed with the rotor body 21 to protrude in a direction (radially inward) approaching the rotation axis X from a cylindrical inner wall face of the rotor body 21. A guide groove that extends radially outward is formed in one of the plurality of protruding portions 21T, and a lock member 25, which has a plate shape, is inserted into this guide groove so as to be able to extend and withdraw. The lock springs 26, which serve as biasing members for biasing the lock members 25 in the direction approaching the rotation axis X, are arranged in the rotor body 21.

The internal rotor 30 is arranged coaxially with the rotation axis X of the external rotor 20 and is supported so as to be able to relatively rotate, in a state of being enclosed by the external rotor 20. The lock recessed portions LD, with which the lock members 25 engage, are formed in an outer-circumferential surface of the internal rotor 30. The restricting recessed portion Ds, which restricts displacement of the lock members 25 toward the side (retarding direction Sb) on which the relative rotation phase is retarded, is formed to have an elongated groove that is shallower than the lock recessed portions LD, in a region continuous with a lock recessed portion LD (see FIG. 3).

Fluid pressure chambers C are demarcated between the plurality of protruding portions 21T, due to the internal rotor 30 enclosing the external rotor 20. Furthermore, each of the fluid pressure chambers C is partitioned by a vane 31, and advancing chambers Ca and retarding chambers Cb are thus formed. Also, advancing flow paths 34, which are in communication with the advancing chambers Ca, retarding flow paths 35, which are in communication with the retarding chambers Cb, and unlocking flow paths 36 for supplying a hydraulic fluid in an unlocking direction to the lock recessed portions LD are formed in the internal rotor 30.

A torsion spring 27 is provided that extends between the rear block 22 of the external rotor 20 and the internal rotor 30. The torsion spring 27 is configured to, for example, exert a biasing force on the internal rotor 30 such that, even in a state where the relative rotation phase is the most retarded phase, the relative rotation phase at least reaches an intermediate lock phase LS against average cam torque exerted on the exhaust shaft 8. Here, the intermediate lock phase LS refers to a phase between the most advanced phase and the most retarded phase, excluding the most advanced phase and the most retarded phase.

The lock mechanism L is constituted by the lock members 25, which are supported so as to be able to shift in a direction approaching or moving away from the rotation axis X relative to the external rotor 20, the lock springs 26 serving as biasing members for biasing the lock members 25 in a protruding direction, and the lock recessed portions LD and the restricting recessed portion Ds that are formed in the internal rotor 30. Although the shape of the lock members 25 is a plate shape, the shape is not limited to the plate shape, and may alternatively be a rod shape, for example. Also, the lock mechanism L may alternatively be configured such that the lock members 25 are supported by the internal rotor 30, and the lock recessed portions are formed in the external rotor 20.

Figure 4:
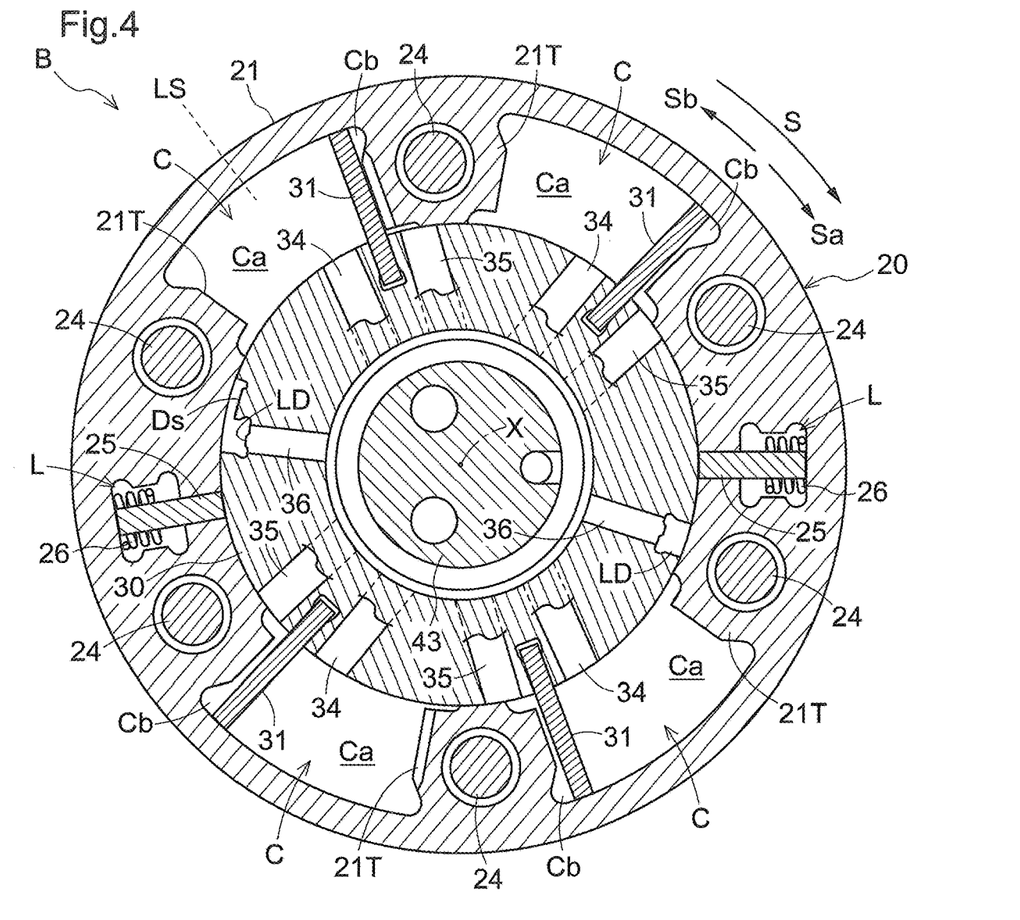
FIG. 4 is a cross-sectional view of the valve opening-closing timing control device at the most advanced phase.

In the exhaust-side valve opening-closing timing control device B in this embodiment, when the relative rotation phase is the intermediate lock phase LS (see FIG. 3), the lock members 25 are engageably inserted into the lock recessed portions LD by the biasing force of the lock springs 26, and the relative rotation phase is retained at the intermediate lock phase LS. On the other hand, if the lock mechanism L is unlocked, the relative rotation phase is displaced from the intermediate lock phase LS in the advancing direction Sa or the retarding direction Sb. FIG. 4 shows the valve opening-closing timing control device B in which the relative rotation phase has been displaced to the most advanced phase.

The restricting recessed portion Ds reduces the change width of the relative rotation phase due to a lock member 25 engaging therewith. That is to say, if the lock member 25 engages with the restricting recessed portion Ds, the relative rotation phase is allowed to be displaced only within the region where the restricting recessed portion Ds is formed. Thus, the lock members 25 can readily transition to the state of engaging with the lock recessed portions LD.

As shown in FIG. 2, the valve unit VU, which serves as a phase adjustment mechanism, has a structure in which a unit case thereof accommodates a phase control valve 41 and a lock control valve 42, and is provided in a mode in which a flow path forming shaft portion 43, which is integrally formed with the unit case, is inserted into a space formed inward of an inner-circumferential surface 30S of the internal rotor 30. A groove-shaped portion that is in communication with a port of the phase control valve 41 and a groove-shaped portion that is in communication with a port of the lock control valve 42 are formed in an outer-circumferential surface of the flow path forming shaft portion 43, and a plurality of ring-shaped seals 44 are provided between the outer-circumferential surface of the flow path forming shaft portion 43 and the inner-circumferential surface 30S of the internal rotor 30 so as to separate these groove-shaped portions from each other.

The phase control valve 41 selects either the advancing flow paths 34 or the retarding flow paths 35 to supply hydraulic fluid to the selected flow paths and discharge the hydraulic fluid from the other flow paths, thereby realizing an operation to displace the relative rotation phase in the advancing direction Sa or the retarding direction Sb. Also, the lock control valve 42, when in a state where the relative rotation phase is the intermediate lock phase LS, supplies the hydraulic fluid to the unlocking flow path 36, thereby operating the pair of lock members 25 in the unlocking direction to realize unlocking.

The engine E includes a hydraulic pump P, which is driven by the engine E to supply oil in an oil pan as the hydraulic fluid. A flow path is configured such that the hydraulic fluid from this hydraulic pump P is supplied to the valve unit VU. Note that, although the phase control valve 41 and the lock control valve 42 are shown in the valve unit VU, the valve unit VU may alternatively be configured without the lock control valve 42 by configuring the phase control valve 41 so as to be able to unlock the lock mechanism L.

(Engine Control Unit)

An engine control unit 50 performs relative rotation phase control for the intake-side valve opening-closing timing control device A, relative rotation phase control for the exhaust-side valve opening-closing timing control device B, and lock control for the lock mechanism L (see FIGS. 1 and 2). In these controls, a feature of this embodiment lies in adjustment of timings of opening and the exhaust valve Vb using the exhaust-side valve opening-closing timing control device B. In the following description, the relative rotation phase control for the exhaust-side valve opening-closing timing control device B and the lock control for the lock mechanism L will mainly be described.

The engine control unit 50 includes an electromagnetic valve control portion 51 and a phase control portion 52. As shown in FIG. 1, the engine control unit 50 realizes control by means of software using a microprocessor, a DSP, or the like, and the electromagnetic valve control portion 51 and the phase control portion 52 are constituted by software. Note that these portions may alternatively be constituted by hardware or may also be constituted by a combination of software and hardware.

The electromagnetic valve control portion 51 controls the opening and closing of the four electromagnetic valves 28 provided on the bypass passages 18. The phase control portion 52 operates the valve unit VU to control the relative rotation phase of the exhaust-side valve opening-closing timing control device B and the lock mechanism L.

The engine control unit 50 receives input of signals from the shaft sensor 16, the phase sensor 17, the intake temperature sensor 53, and the intake pressure sensor 54. Also, the engine control unit 50 outputs control signals to the injector 9, the spark plug 10, the starter motor 15, and the valve unit VU.

The electromagnetic valve control portion 51 controls the opening and closing of the electromagnetic valves 28 based on the rotation angle and the rotational speed of the engine E obtained from the shaft sensor 16 and based on an engine load (charging efficiency etc.) that is calculated based on the intake temperature measured by the intake temperature sensor 53, the intake pressure measured by the intake pressure sensor 54, and the amount of taken-in air measured by the air flow meter 55.

The phase control portion 52 controls the valve unit VU in a state where the relative rotation phase is fed back from the phase sensor 17, based on the rotation angle and the rotational speed of the engine E obtained from the shaft sensor 16 and based on the engine load (charging efficiency etc.) that is calculated based on the intake temperature measured by the intake temperature sensor 53, the intake pressure measured by the intake pressure sensor 54 and the amount of taken-in air measured by the air flow meter 55, and sets the relative rotation phase of the exhaust-side valve opening-closing timing control device B to a phase that is suited to the state of the engine E or the like. Note that the engine load is not limited to the charging efficiency and may also be calculated based on the opening of a throttle valve or torque exerted on the crankshaft 1, for example.

Figure 6:
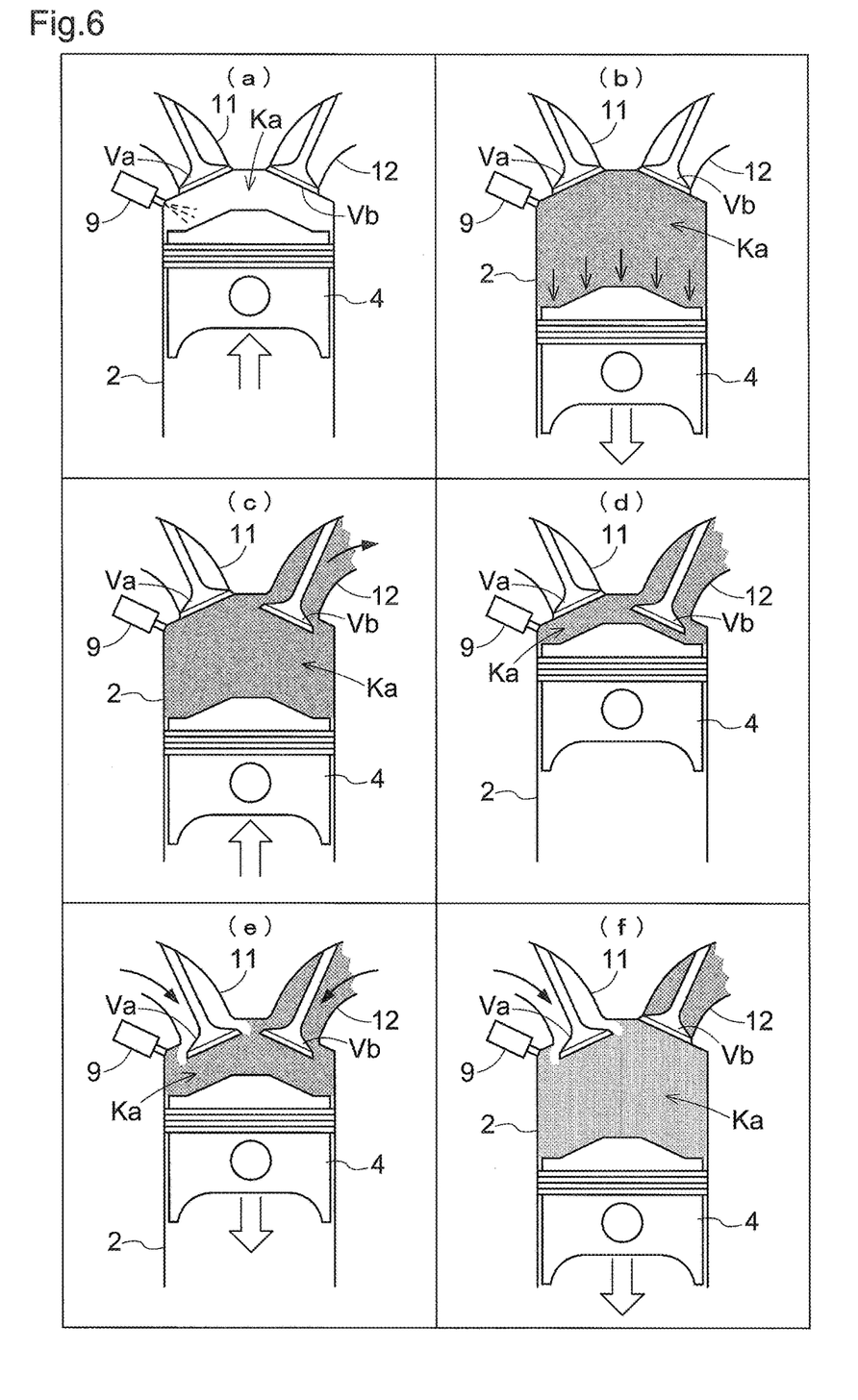
FIG. 6 shows operations of valves in order from fuel injection to an intake process in the internal combustion engine.

In this embodiment, four processes of intake, compression, expansion, and exhaust is defined as one cycle, and FIG. 6 is a conceptual diagram of one cycle in which a later-described overlap period N occurs. FIG. 6(a) shows a timing at which the piston 4 reaches the top dead center TDC due to the compression process. At the timing in FIG. 6(a), the position of the piston 4 need not coincide with the top dead center TDC. At the timing in FIG. 6(a), fuel is injected into the combustion chamber Ka by the injector 9, ignition is performed by the spark plug 10, and the process advances to the expansion process (combustion process).

FIG. 6(b) shows a timing at which the process advances to the expansion process. As shown in FIG. 6(b), in this expansion process, the intake valve Va and the exhaust valve Vb are in a closed state. Thereafter, the exhaust valve Vb is opened immediately before the piston 4 reaches the bottom dead center BDC, and the open state of the exhaust valve Vb is maintained at the timing (exhaust process) shown in FIG. 6(c). Thereafter, the piston 4 reaches the top dead center TDC at a timing shown in FIG. 6(d), the intake valve Va is opened and the open state of the exhaust valve Vb is maintained at a timing (timing of advancing to the intake process) shown in FIG. 6(e). Thereafter, the exhaust valve Vb is closed at a timing (during the intake process) shown in FIG. 6(f).

Figure 7:
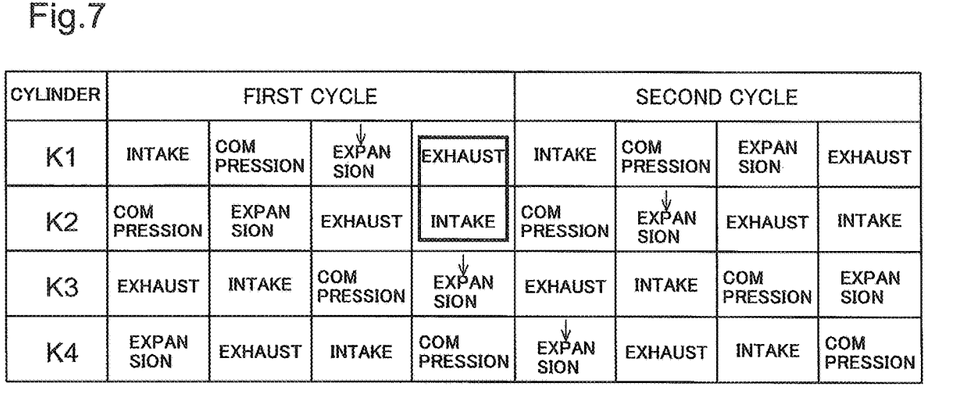
FIG. 7 shows a combustion cycle in cylinders.

FIG. 7 shows a cycle diagram of the engine E. In this embodiment, assuming that the first, second, third, and fourth cylinders are denoted as K1, K2, K3, and K4, respectively, in the order of arrangement from the side on which the output sprocket 1S of the crankshaft 1 is located, it is envisioned that the first cylinder K1, the third cylinder K3, the fourth cylinder K4, and the second cylinder K2 are ignited in this order. Note that, although the cylinder K in which combustion is first performed (initial combustion) by performing cranking after the engine E has been started is not fixed, the following description of this embodiment is based on the premise that combustion is first performed in the first cylinder K1 immediately after cranking (see arrows in FIG. 7).

In the first cylinder K1 in which first combustion is performed in the combustion chamber Ka immediately after cranking of the starter motor 15, the intake valve Va is opened to take in air due to cranking in the intake process, and then the intake valve Va is closed to compress fresh air in the compression process. Then, fuel is injected into the combustion chamber Ka by the injector 9, ignition is performed by the spark plug 10, and the fuel is burned (initial combustion) in the expansion process (combustion process). Next, the exhaust valve Vb is opened immediately before the bottom dead center BDC is reached in the expansion process, and burned gas is emitted to the exhaust passage 12 of the exhaust process.

Figure 8:
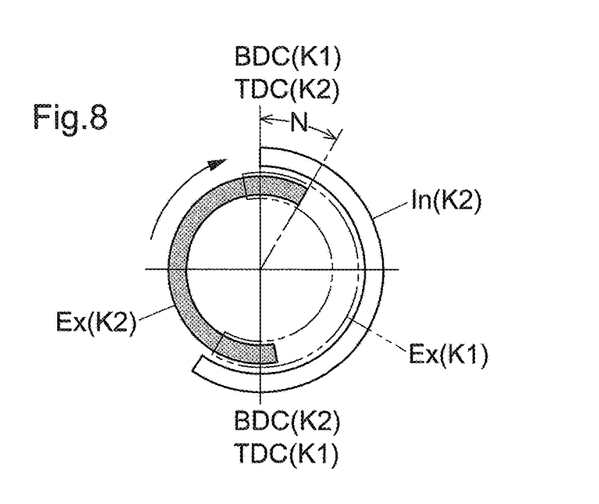
FIG. 8 shows timings of opening and closing an exhaust valve and an intake valve in a state of the intermediate lock phase being retained.

Solid lines shown in FIG. 8 indicate an intake period In in which the intake valve Va of the second cylinder K2 is open, and an exhaust period Ex in which the exhaust valve Vb of the second cylinder K2 is open, with the operation of the piston 4 serving as a reference, in a state where the relative rotation phase of the exhaust-side valve opening-closing timing control device B is retained at the intermediate lock phase LS. In FIG. 8, time advances in the clockwise direction indicated by the arrow, and operations are performed as follows with the opening-closing timing of the intake-side valve opening-closing timing control device A being fixed.

When the engine E is started, in a state where the relative rotation phase of the exhaust-side valve opening-closing timing control device B is retained at the intermediate lock phase LS, an overlap period N occurs in which the exhaust period Ex in which the exhaust valve Vb is open overlaps the intake period In in which the intake valve Va is open, at the timing at which the piston 4 in the second cylinder K2 reaches the top dead center TDC and the intake valve Va is opened. That is to say, the exhaust valve Vb remains open at the timing at which the intake valve Va of the second cylinder K2 is opened. Although, in this embodiment, the relative rotation phase of the intake-side valve opening-closing timing control device A is also retained at the intermediate lock phase, the relative rotation phase may alternatively be the most advanced phase or the most retarded phase as long as it is a phase at which the overlap period N occurs after the top dead center TDC is reached, and is not specifically limited.

As mentioned above, burned gas that has been burned in the combustion chamber Ka in the second cylinder K2 is emitted from the exhaust valve Vb in the open state to the exhaust passage 12 as the piston 4 rises. Then, the intake valve Va is opened at the timing at which the piston 4 in the second cylinder K2 reaches the top dead center TDC, and air is taken into the combustion chamber Ka via the intake valve Va as the piston 4 lowers. At this time, as a result of the overlap period N occurring, part of the burned gas in the exhaust passage 12 while air is taken in can be suctioned into the combustion chamber Ka via the exhaust valve Vb (internal EGR).

After the engine E has been started, initial combustion in the cylinders K needs to be reliably performed, and therefore, a large amount of injected fuel is introduced into the combustion chambers Ka, and unburned HC generated due to incomplete combustion is likely to increase. Moreover, immediately after the engine E has been started, the catalytic converter 13 for cleaning unburned HC is not yet warm nor activated, and thus, a large amount of unburned HC is emitted to the outside.

In this embodiment, in the first cycle, burned gas is introduced from the first cylinder K1 that is in the exhaust process to the combustion chamber Ka in the second cylinder K2 that is in the intake process. Specifically, as mentioned above, the bypass passage 18 is provided that connects the exhaust passage 12 of the first cylinder K1 to the exhaust passage 12 of the second cylinder K2, and the electromagnetic valve 28 provided on the bypass passage 18 is opened by the electromagnetic valve control portion 51 (see FIG. 5). Thus, burned gas in the first cylinder K1 is introduced via the exhaust passage 12 of the second cylinder K2 into the combustion chamber Ka in the second cylinder K2 into which only fresh air has been introduced. As a result, during initial combustion during which the amount of gas emitted due to combustion is large and a large amount of unburned HC is emitted, unburned HC emitted from the first cylinder K1 is reburned in the combustion chamber Ka in the second cylinder K2, and accordingly, the amount of emitted unburned HC can be reduced.

As indicated by dash-double dot lines in FIG. 8, the overlap period N of the second cylinder K2 is present at an early stage of the exhaust process (exhaust period Ex (K1)) of the first cylinder K1. This early stage of the exhaust process is immediately after the exhaust valve Vb has been opened, and therefore, the exhaust pressure in the exhaust passage 12 of the first cylinder K1 is high (see FIG. 10). Meanwhile, combustion has not yet been started in the second cylinder K2, and time has elapsed since the exhaust valve Vb opened, and therefore, the exhaust pressure in the exhaust passage 12 of the second cylinder K2 is relatively low. For this reason, a large amount of burned gas in the first cylinder K1 can be introduced into the combustion chamber Ka in the second cylinder K2. Accordingly, the amount of emitted unburned HC can be reliably reduced.

As described thus far, according to this embodiment, in a period (predetermined period) from before initial combustion is performed in the combustion chamber Ka in the first cylinder K1 immediately after cranking until when the exhaust valve Vb is first closed after the initial combustion has been performed, the relative rotation phase of the exhaust-side valve opening-closing timing control device B is set on the retarding side by the phase control portion 52 such that the overlap period N occurs, and the electromagnetic valve 28 is opened by the electromagnetic valve control portion 51. After the exhaust valve Vb has been first closed, the electromagnetic valve 28 is closed by the electromagnetic valve control portion 51. Note that it is preferable that the electromagnetic valve 28 is closed during cranking performed until initial combustion is performed in the combustion chamber Ka in the first cylinder K1. Thus, exhaust interference is suppressed in the cylinders K, and thus pumping loss in the cylinders K can be reduced.

The engine E in this embodiment supplies fuel from the injector 9 to the combustion chambers Ka in the mode of directly injecting the fuel thereinto, and thus, when, particularly, the engine E is started with the environmental temperature being lower than a set value, part of the fuel is likely to attach to the inner walls of the cylinders K that constitute the combustion chambers Ka. If the temperature of the inner walls of the cylinders K is low, the attached fuel hardly evaporates, but remains on the cylinder inner walls even after combustion is caused by ignition, and part of the remaining fuel is emitted as unburned HC (unburned hydrocarbon) together with burned gas.

However, with the configuration in which burned gas in the first cylinder K1 is introduced into the combustion chamber Ka in the second cylinder K2 as in this embodiment, the temperature in the combustion chamber Ka in the second cylinder K2 increases, thus the fuel injected from the injector 9 is likely to evaporate, and it is possible to suppress such an issue as in the case where fuel is attached to the inner walls of the cylinders K. Note that, in the second cylinder K2 into which unburned HC is introduced from the first cylinder K1, the amount of combustion injected into the combustion chamber Ka by the injector 9 may be reduced while giving consideration to the amount of unburned HC introduced. As a result, the amount of unburned HC emitted from the second cylinder K2 can be further reduced.

In and after the second cycle, combustion has already been started in the cylinders K, and thus, internal EGR can be generated as a result of the overlap period N occurring. That is to say, burned gas need not be introduced from one cylinder K into another cylinder K by the bypass passage 18, and it is therefore preferable to close the electromagnetic valve 28. Note that, in and after the second cycle as well, the electromagnetic valve 28 may be kept in an opened state to introduce burned gas from one cylinder K into another one cylinder K before it is determined that the rotational speed of the engine E has reached a predetermined value and complete combustion has occurred.

Figure 9:
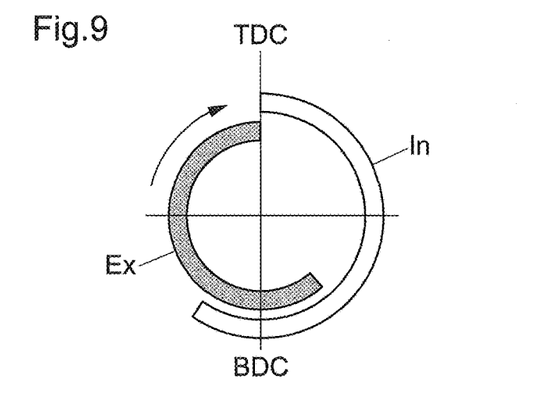
FIG. 9 shows timings of opening and closing the exhaust valve and the intake valve at the most advanced phase.

On the other hand, during idling or the like during which the engine E is in a low load state, control is performed by the phase control portion 52 such that the overlap period N does not occur. Specifically, the relative rotation phase of the exhaust-side valve opening-closing timing control device B is controlled toward the advancing side, and the opening timing (exhaust period Ex) of the exhaust valves Vb in the cylinders K is made to come earlier, as shown in FIG. 9. As a result, during idling or the like during which a small amount of fresh air is introduced into the cylinders K, internal EGR is not introduced in the combustion chambers Ka, and therefore, the combustion stability can be ensured. At this time, it is preferable to also close the electromagnetic valves 28 on the bypass passages 18 at the same time. Thus, exhaust interference is suppressed in the cylinders K, and therefore, pumping loss in the cylinders K can be reduced. Note that, in the case where the engine E is started with the environmental temperature being higher than or equal to the set value, control may also be performed such that the overlap period N does not occur in the first cycle.

In this embodiment, when (in a predetermined period in which), after the vehicle has transitioned to normal driving, the charging efficiency of the engine E is greater than or equal to a predetermined value (e.g. 60%), and the rotational speed of the engine E is lower than or equal to a predetermined rotational speed (e.g. 2500 rpm), i.e. the engine E is in a high-load low-rotation state, the relative rotation phase of the exhaust-side valve opening-closing timing control device B is set on the retarding side by the phase control portion 52 such that the overlap period N occurs, and the electromagnetic valve 28 is opened by the electromagnetic valve control portion 51. Here, the charging efficiency is calculated based on the intake temperature measured by the intake temperature sensor 53, the intake pressure measured by the intake pressure sensor 54, and the amount of taken-in air measured by the air flow meter 55.

Figure 10:
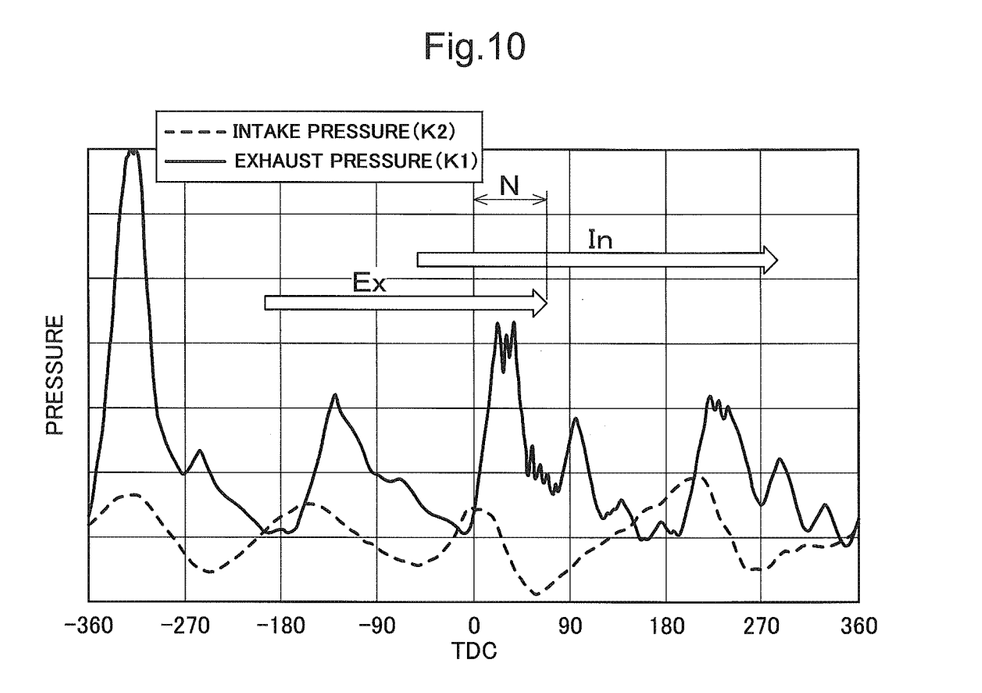
FIG. 10 shows an intake pressure and an exhaust pressure in a high-load low-rotation period.

Since the intake pressure is high in the high-load low-rotation state, it is difficult to introduce internal EGR in the combustion chambers Ka in the cylinders K. For this reason, if the electromagnetic valve 28 is opened in the high-load low-rotation state as in this embodiment, burned gas with high pressure at an early stage of the exhaust process in the exhaust passage 12 of one cylinder K is introduced into the exhaust passage 12 of another cylinder K in which the exhaust valve Vb is open in the overlap period N after the top dead center TDC has been reached. That is to say, as shown in FIG. 10, immediately after the top dead center TDC has been reached in the another cylinder K, the early stage of the exhaust process with high exhaust pressure in the one cylinder K indicated by the solid line overlaps the overlap period N.

As a result, the flow rate of the internal EGR that is returned to the combustion chamber Ka in the another cylinder K increases, and thus, the internal EGR can be reliably introduced in the combustion chamber Ka. Accordingly, the emission of unburned HC can be suppressed. In addition, if the internal EGR is introduced in a high-load period, knocking can be suppressed, and thus, the ignition timing can be advanced, and the heat efficiency (fuel economy and torque) can be improved.

Other Embodiments

In addition to the above embodiment, the following configurations may also be employed.

(a) The electromagnetic valve 28 provided on each of the bypass passages 18 may be omitted. In this case, a function similar to that of the electromagnetic valve 28 can be ensured if control is performed by the phase control portion 52 such that the overlap period N does not occur when burned gas need not be introduced from one cylinder K into another cylinder K through the bypass passage 18.

(b) The check valve 19 on each of the bypass passages 18 may be omitted, and only the electromagnetic valve 28 may be provided thereon. In this case, the electromagnetic valve 28 need only be closed at a timing at which exhaust gas in the exhaust passage 12 of another cylinder K that is in the exhaust process based on the rotation angle of the engine E flows into the combustion chamber Ka in another cylinder K that is in the expansion process. Thus, the electromagnetic valve 28 can ensure a function equal to that of the check valve 19.

(c) The relative rotation phase of the exhaust-side valve opening-closing timing control device B may be set to the most retarded phase or a region near the most retarded phase, rather than the intermediate lock phase LS. That is to say, the state where a relationship is maintained in which the open state of the exhaust valve Vb continues (a relationship in which the overlap period N occurs) at the timing at which the intake valve Va is opened set in a region where the relative rotation phase is closer to the most retarded phase than to an intermediate phase. By configuring this setting, the region in which the relative rotation phase of the exhaust-side valve opening-closing timing control device B can be displaced in the advancing direction Sa can be expanded after the engine E has been started.

(d) A configuration may be employed in which the time during which the open state of the exhaust valve Vb continues (the time during which the overlap period N occurs)

can be adjusted at the timing at which the intake valve Va is opened, by controlling the intake-side valve opening-closing timing control device A. By employing this configuration, the overlap period N can also be set to a value that is adapted to the state of the engine E.

(e) The engine E (internal combustion engine) may have the injector 9 at a position at which fuel is injected from an intake passage side into the combustion chamber Ka at a timing at which the intake valve Va is opened. In an engine that has the injector 9 at such a position as well, the control device for an internal combustion engine can reduce unburned HC when the engine E is started.

INDUSTRIAL APPLICABILITY

The present invention can be used in an internal combustion engine that includes a valve opening-closing timing control device for setting timings of opening and closing an exhaust valve.

REFERENCE SIGNS LIST

1: Crankshaft
4: Piston
7: Intake shaft
8: Exhaust shaft
9: Injector
11: Intake passage
12: Exhaust passage
18: Bypass passage
19: Check valve
28: Electromagnetic valve
20: External rotor (driving-side rotator)
30: Internal rotor (driven-side rotator)
50: Engine control unit
B: Valve opening-closing timing control device
E: Engine (internal combustion engine)
K: Cylinder
Ka: Combustion chamber
TDC: Top dead center
BDC: Bottom dead center
Va: Intake valve
Vb: Exhaust valve
VU: Valve unit (phase adjustment mechanism)
X: Rotation axis

The invention claimed is:

1. A control device for an internal combustion engine comprising:
   an internal combustion engine including: a plurality of cylinders each including a combustion chamber; a piston that moves between a top dead center position and a bottom dead center position in each of the cylinders; a crankshaft connected to the piston; an intake passage and an exhaust passage that are connected to the combustion chamber in each of the cylinders; an intake valve provided at a connecting port between the combustion chamber in each of the cylinders and the intake passage, and an exhaust valve provided at a connecting port between the combustion chamber and the exhaust passage; and an intake shaft and an exhaust shaft that are connected to the intake valve and the exhaust valve, respectively; and
   a valve opening-closing timing control device including: a driving-side rotator that rotates synchronously with the crankshaft; a driven-side rotator that rotates integrally with the exhaust shaft, the driven-side rotator being arranged so as to be able to relatively rotate with respect to the driving-side rotator, coaxially with a rotation axis of the driving-side rotator; and a phase adjustment mechanism for setting a relative rotation phase of the driving-side rotator and the driven-side rotator, wherein
   the phase adjustment mechanism overlaps a timing of opening the intake valve with a timing of opening the exhaust valve, by setting, in a predetermined period, the relative rotation phase such that the exhaust valve closes after the top dead center position has been reached,
   a bypass passage is provided that connects the exhaust passage of one of the cylinders that is in an exhaust process to the exhaust passage of another one of the cylinders that is in an intake process at the same time as the exhaust process, and
   the bypass passage is provided with a check valve for allowing the flow of exhaust gas from the exhaust passage of the one of the cylinders to the exhaust passage of the another one of the cylinders, and for blocking the flow of exhaust gas from the exhaust passage of the another one of the cylinders to the exhaust passage of the one of the cylinders.

2. A control device for an internal combustion engine comprising:
   an internal combustion engine including: a plurality of cylinders each including a combustion chamber; a piston that moves between a top dead center position and a bottom dead center position in each of the cylinders; a crankshaft connected to the piston; an intake passage and an exhaust passage that are connected to the combustion chamber in each of the cylinders; an intake valve provided at a connecting port between the combustion chamber in each of the cylinders and the intake passage, and an exhaust valve provided at a connecting port between the combustion chamber and the exhaust passage; and an intake shaft and an exhaust shaft that are connected to the intake valve and the exhaust valve, respectively; and
   a valve opening-closing timing control device including: a driving-side rotator that rotates synchronously with the crankshaft; a driven-side rotator that rotates integrally with the exhaust shaft, the driven-side rotator being arranged so as to be able to relatively rotate with respect to the driving-side rotator, coaxially with a rotation axis of the driving-side rotator; and a phase adjustment mechanism for setting a relative rotation phase of the driving-side rotator and the driven-side rotator, wherein
   the phase adjustment mechanism overlaps a timing of opening the intake valve with a timing of opening the exhaust valve, by setting, in a predetermined period, the relative rotation phase such that the exhaust valve closes after the top dead center position has been reached,
   a bypass passage is provided that connects the exhaust passage of one of the cylinders that is in an exhaust process to the exhaust passage of another one of the cylinders that is in an intake process at the same time as the exhaust process,
   the bypass passage is provided with an electromagnetic valve,
   the predetermined period is a period from before initial combustion is performed in the combustion chamber immediately after cranking in the one of the cylinders until when the exhaust valve that is opened after the initial combustion has been performed is first closed, and the electromagnetic valve is open in the predetermined period and is closed when the predetermined period ends.

3. A control device for an internal combustion engine comprising:

an internal combustion engine including: a plurality of cylinders each including a combustion chamber; a piston that moves between a top dead center position and a bottom dead center position in each of the cylinders; a crankshaft connected to the piston; an intake passage and an exhaust passage that are connected to the combustion chamber in each of the cylinders; an intake valve provided at a connecting port between the combustion chamber in each of the cylinders and the intake passage, and an exhaust valve provided at a connecting port between the combustion chamber and the exhaust passage; and an intake shaft and an exhaust shaft that are connected to the intake valve and the exhaust valve, respectively; and a valve opening-closing timing control device including: a driving-side rotator that rotates synchronously with the crankshaft; a driven-side rotator that rotates integrally with the exhaust shaft, the driven-side rotator being arranged so as to be able to relatively rotate with respect to the driving-side rotator, coaxially with a rotation axis of the driving-side rotator; and a phase adjustment mechanism for setting a relative rotation phase of the driving-side rotator and the driven-side rotator, wherein the phase adjustment mechanism overlaps a timing of opening the intake valve with a timing of opening the exhaust valve, by setting, in a predetermined period, the relative rotation phase such that the exhaust valve closes after the top dead center position has been reached, a bypass passage is provided that connects the exhaust passage of one of the cylinders that is in an exhaust process to the exhaust passage of another one of the cylinders that is in an intake process at the same time as the exhaust process, the bypass passage is provided with an electromagnetic valve, while the internal combustion engine is operating, the predetermined period is a period in which charging efficiency of the internal combustion engine is greater than or equal to a predetermined value, and a rotational speed of the internal combustion engine is smaller than or equal to a predetermined rotational speed and is in a high-load low-rotation state, and the electromagnetic valve is open only in the predetermined period.

* * * * *